(12) United States Patent
Panuce (10) Patent No.: US 9,136,696 B2
(45) Date of Patent: Sep. 15, 2015

(54) EARLY BREAK INVERTER BYPASS SAFETY SWITCH

(75) Inventors: Donald G. Panuce, Sarasota, FL (US); Marsha Panuce, legal representative, Sarasota, FL (US)

(73) Assignee: ADVANCE CONTROLS, INC, Bradenton, FL (US)

( * ) Notice: Subject to any disclaimer, the term of this patent is extended or adjusted under 35 U.S.C. 154(b) by 19 days.

(21) Appl. No.: 13/356,248

(22) Filed: Jan. 23, 2012

(65) Prior Publication Data

US 2013/0188284 A1    Jul. 25, 2013

(51) Int. Cl.
*H01H 19/00* (2006.01)
*H02H 7/122* (2006.01)

(52) U.S. Cl.
CPC .................................. *H02H 7/1227* (2013.01)

(58) Field of Classification Search
USPC .............. 200/11 R, 4, 38 B, 8 R, 6 B; 307/64
See application file for complete search history.

(56) References Cited

U.S. PATENT DOCUMENTS

| | | | | |
|---|---|---|---|---|
| 4,133,990 A * | 1/1979 | Wanner et al. | ................ | 200/6 B |
| 4,264,791 A * | 4/1981 | Williams | ......................... | 200/4 |
| 4,335,288 A * | 6/1982 | Ludwig et al. | ................ | 200/307 |
| 4,481,386 A * | 11/1984 | Rose | .......................... | 200/11 R |
| 4,724,287 A * | 2/1988 | Heng et al. | ....................... | 200/14 |
| 4,861,949 A * | 8/1989 | Bortolloni et al. | ............ | 200/5 R |
| 5,084,597 A * | 1/1992 | Lindsey et al. | ............... | 200/8 R |
| 5,642,002 A * | 6/1997 | Mekanik et al. | ................ | 307/64 |
| 5,646,459 A * | 7/1997 | Hatate et al. | .................... | 307/85 |
| RE40,161 E * | 3/2008 | Panuce | ............................ | 200/14 |
| 7,939,968 B2 * | 5/2011 | Hjort et al. | ....................... | 307/66 |
| 8,125,102 B2 * | 2/2012 | Cohen et al. | .................... | 307/64 |
| 8,212,401 B2 * | 7/2012 | Linkhart et al. | ................ | 307/64 |
| 8,803,361 B2 * | 8/2014 | Johansen et al. | ................ | 307/64 |

* cited by examiner

*Primary Examiner* — Vanessa Girardi (74) *Attorney, Agent, or Firm* — Miller, Matthias & Hull LLP (57) ABSTRACT

An early break bypass switch provides a modular system for bypassing an inverter when needed without allowing switching induced damage to the inverter. In an embodiment of the invention, a shaft-mounted switch provides rotatable cams and sliding followers for positive opening contacts while providing an auxiliary switch section for breaking and making contact to an inverter controller in a specific sequence relative to inverter power. In this way, the inverter is both isolated from the line power and also protected during switching from being damaged by switching-induced spikes and transient signals and surges.

13 Claims, 8 Drawing Sheets

EARLY BREAK INVERTER BYPASS SAFETY SWITCH

TECHNICAL FIELD

This patent disclosure relates generally to inverter bypass mechanisms and, more particularly to an inverter bypass safety switch for providing a plurality of power states while preventing damage to the inverter circuit during switching.

BACKGROUND

An inverter drive, sometimes referred to simply as an inverter, is a solid state device used to control the speed of a three phase electric motor. As the name implies, an inverter drive operates by receiving AC electrical power, internally converting (or inverting) that power into DC electrical power, and then outputting the DC power in a variably pulsed form to control the speed of an associated three phase motor. Thus, for example, longer DC pulses would provide higher motor speeds, while shorter pulses would provide lower speeds.

Soft starters and solid state starters operate in a manner similar to inverter drives except these types of starters do not incorporate a means for speed control. For the sake of simplicity we will describe and refer to inverter drives in the remaining part of this discussion, but by implication soft starters, solid state starters and other types of starters using solid state components are included and hereinafter are referred to as inverter drives.

Such inverter drives are common in industry and are used in conveyors, fans, cooling towers, extruders, and many other applications. However, as solid state devices, inverter drives are vulnerable to damage from electrical disturbances such as lightning strikes, power surges, low voltages, and other disturbances in the electrical line. When a disturbance of sufficient magnitude occurs, the inverter drive may fail, thus preventing the motor from operating, and stopping the application for which the motor was being used. In addition to the damage or loss caused by the cessation of the application, the damage to the inverter itself may also be costly and/or time-consuming to remedy.

Although certain methods have been attempted for the purpose of isolating inverters during electrical disturbances, these methods involve expensive and unreliable contactors, relays and timers for switching. Moreover, the switching used to isolate the inverter drive may itself cause the damage that was to be avoided. This is due to the possibility that sudden changes in the connectivity of the inverter can cause current surges and spikes within the device, damaging sensitive solid state circuitry.

Various solutions have been developed for preventing stray/surge currents from harming the solid state components of inverter drives, including fuses and circuit breakers, voltage regulators and crowbar circuits. A potential disadvantage of fuses and circuit breakers is that they can take time to respond to circuit faults. The time required for the fuse or circuit breaker to blow out is sometimes long enough enough for inverter drive components to be damaged. It is also possible for a power surge to damage equipment without disturbing the fuse or circuit breaker under some conditions.

Voltage regulators, i.e., circuits that regulate voltage output despite changes in input voltage or output load current demand, are widely used in power supplies for inverter drives, controllers and operating devices in equipment. However, as with fuses and circuit breakers, power source voltage regulators may not activate fast enough to protect inverter drives. While crowbar circuits that quickly form a deliberate short circuit across the power supply lines may eliminate some delay in fuse or breaker activation, these safeguards are also prone to failure in the event of very short, infrequent power line transients.

It will be appreciated that this background description has been created by the inventors to aid the reader, and is not to be taken as a reference to prior art, nor as an indication that any of the indicated problems were themselves appreciated in the art.

SUMMARY

It is an object of the invention to provide a simple and reliable means for isolating an inverter during electrical disturbances so that the motor can continue at full speed/full power operation until a safe stopping point is reached, while preventing damage to the inverter caused by switching.

Another object of the present invention is to provide a mechanical means for isolating an inverter without damaging the inverter. The present invention does not require contactors, relays, solenoids, or coils that can consume power, stick, or burn out.

Still another object of the present invention is to provide a means for isolating an inverter without incurring switching damage in a manner that uses positive break contacts. Should a contact "weld", the switch handle cannot be turned. If the switch handle cannot be turned, the contacts cannot transfer. If the switch handle is able to be turned, the contacts transfer. This feature assures the operator that when the switch has been turned the contacts have been transferred.

Yet another object of the present invention is to provide a switch having positive removal of the electrical power from the inverter drive while avoiding switching damage. In other words, the switch can be used to disconnect power from both the incoming lines into the inverter and outgoing lines from the inverter.

A further object of the invention is to provide a manual or power operated disconnect switch having an early break auxiliary contact (or contacts) that opens before the standard power contacts so the inverter drive control circuit is interrupted before the standard power contacts of the disconnect switch open.

Another object of the invention is to provide a disconnect switch with early break auxiliary contact modules that can be added or removed without using special tools.

Still another object of the invention is to provide a disconnect switch having means for protecting an inverter drive from stray/surge currents that can be installed or removed without using special tools.

Yet another object of the invention is to provide a disconnect switch having means for protecting an inverter drive from stray/surge currents that can be designed as a one, two, three, four or more power pole disconnect switch.

Yet another object of the invention is to provide a disconnect switch having means for protecting an inverter drive from stray/surge currents that can be used when only a very small amount of current is available.

Further and alternative aspects and features of the disclosed principles will be appreciated from the following detailed description and the accompanying drawings, of which:

DETAILED DESCRIPTION

This disclosure relates to inverter bypass mechanisms generally and specifically to an inverter bypass safety switch that provides a number of power states that may be switched into while preventing damage to the inverter circuit during switching. In this way, a user seeking to avoid inverter damage by switching the inverter out will not inadvertently cause the damage he sought to avoid via switching spikes and transients.

An inverter bypass safety switch described herein allows for selectively routing electrical power either through or around an AC variable frequency inverter drive to allow a motor to continue operation during electrical disturbances. The switch works in a mechanical fashion, and comprises a contact block containing electrical contacts and cams operably connected to the contacts and mounted on a shaft that can be turned by an operator. The cams are shaped and mounted on the shaft in such a way to provide a desired switching pattern when the shaft is manually rotated.

Although any switching pattern is possible, in an embodiment of the invention, stray/surge currents potentially caused during switching are avoided, thus preventing damage to the solid state components of the inverter drive, via an early break auxiliary contact(s). The early break contact opens prior to the opening of the standard power contacts when the switch is turned off by an operator and closes after the closing of the standard power contacts when the switch is turned on by an operator.

Figure 1:
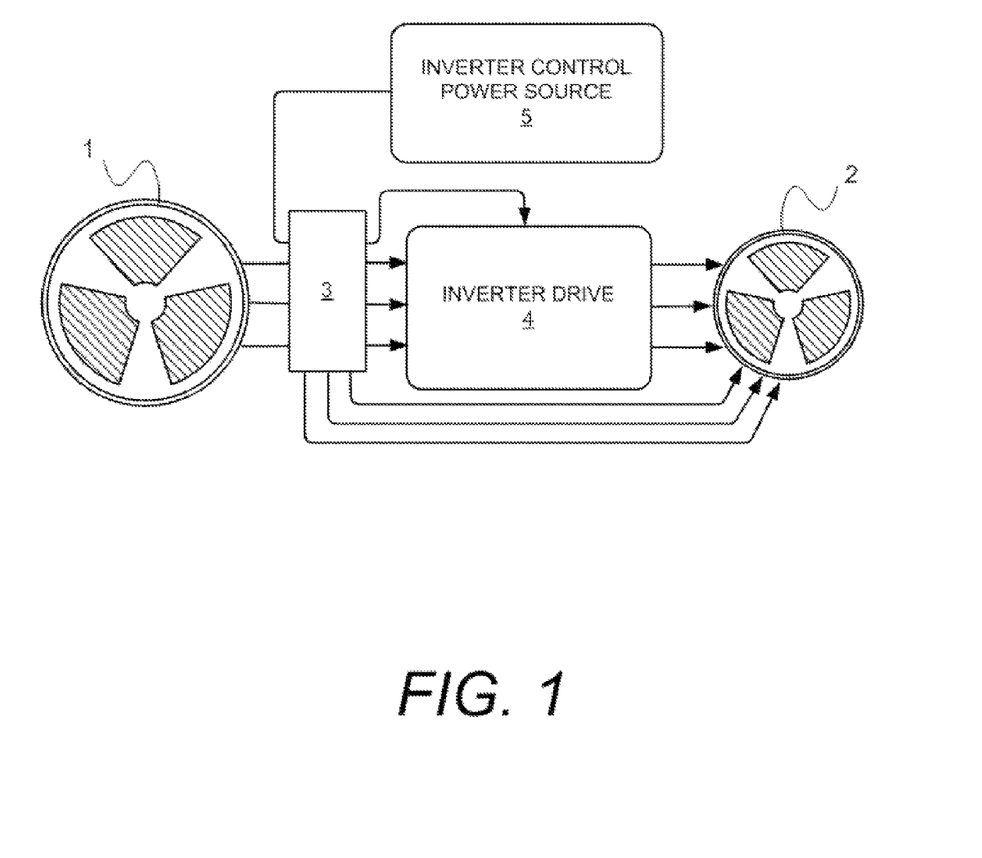
FIG. 1 is a system schematic including a bypass safety switch in accordance with an embodiment of the invention.

Turning to a more detailed discussion of an operating environment and exemplary principles of operation, FIG. 1 is a system schematic showing a power generation and use architecture. In the illustrated embodiment of the invention, an electrical generator 1 provides electrical power to an electrical motor 2, driving the motor 2. The power produced by the generator 1 is conveyed to the motor 2 via a switch 3 in series with an inverter drive 4. As discussed above, the inverter drive 4 is a solid state device for controllably varying the speed of the motor 2.

The inverter drive 4 includes a controller, not shown in this figure, for controlling the operation of the inverter drive 4. The inverter drive controller is powered by a power source 5, which may be a voltage-reduced version of the generator 1 output or otherwise, which is switched through the switch 3.

In this way, the switch 3 is operable to bypass the inverter drive 4 and also to interrupt power to the inverter drive controller.

Figure 2:
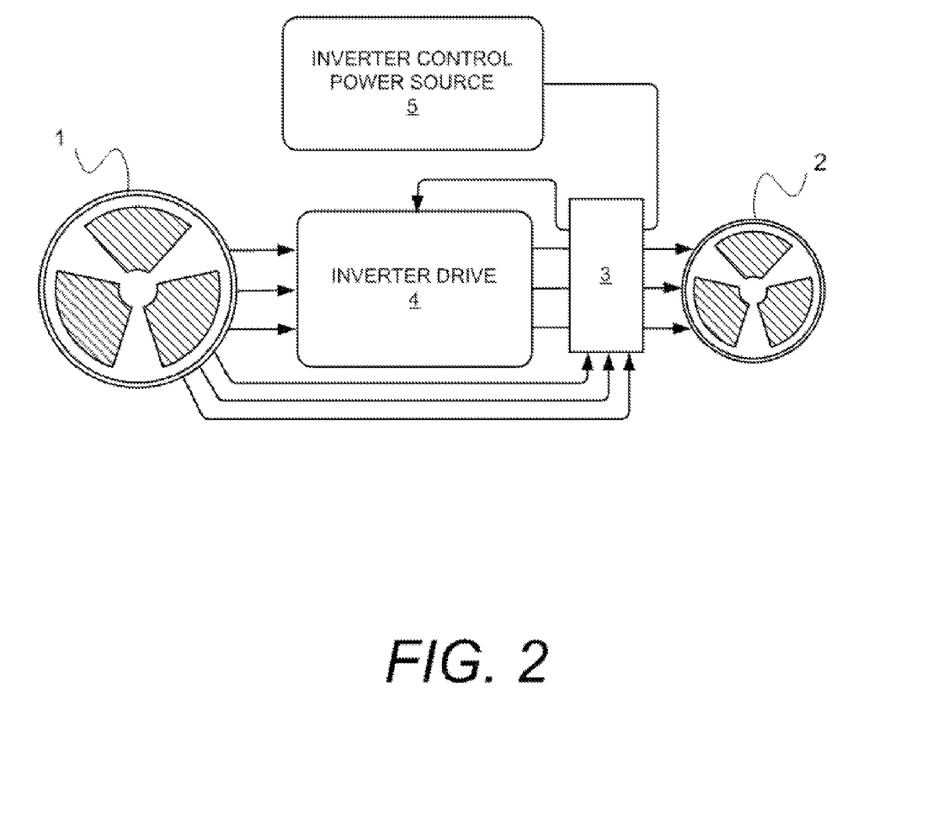
FIG. 2 is a system schematic of an alternative system including a bypass safety switch in accordance with an embodiment of the invention.

The schematic illustration of FIG. 2 shows a system similar to that of FIG. 1, wherein the switch 3 has been relocated within the circuit. In particular, the illustrated system still includes the electrical generator 1 to provide electrical power to drive the electrical motor 2. As in the system of FIG. 1, the inverter drive controller is powered by a power source 5 which is switched through the switch 3.

Although the switch 3 remains in series with the inverter drive 4, it is located adjacent the motor 2 in the circuit of FIG. 2. In this way, the switch 3 does not control main power to the inverter drive 4, but does control the conveyance of power from the inverter drive 4 to the motor 2. As in the system of FIG. 1, the switch 3 also controls the connectivity of the inverter control power source to the inverter controller.

In either case, the operation of the switch 3 to protect the inverter drive can be the same. In particular, as noted above, the switch 3 includes an early break element that disconnects power to the inverter drive controller prior to breaking the main connection (between the generator 1 and inverter drive 4 in the system of FIG. 1 and between the inverter drive 4 and the motor 2 in the system of FIG. 2.

Figure 3:
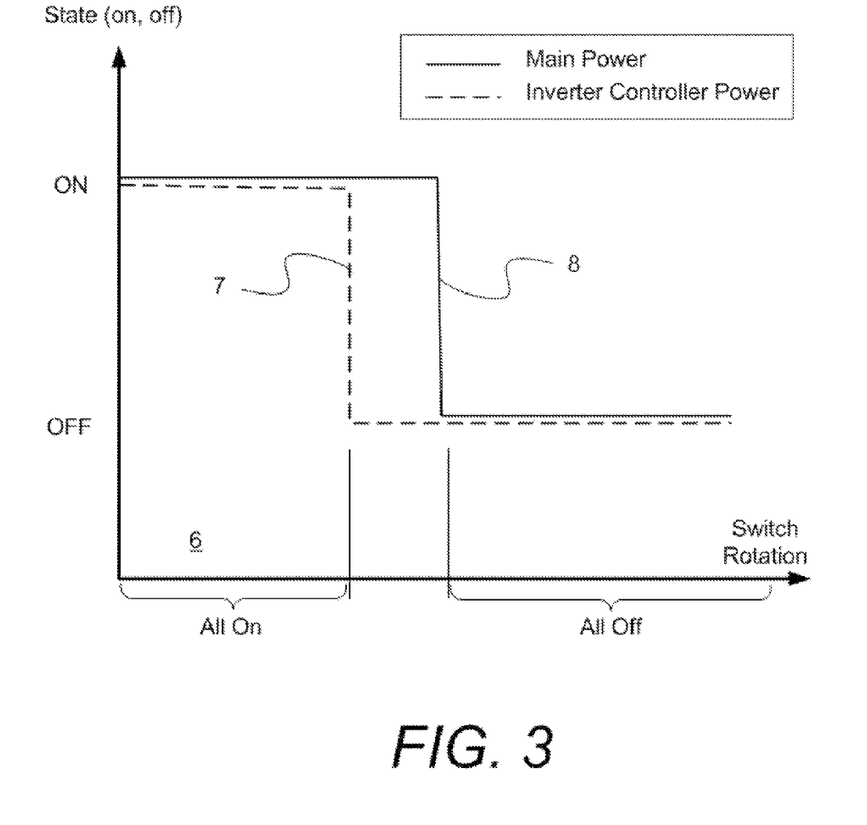
FIG. 3 is a timing plot showing main power and controller power switching sequence in accordance with an embodiment of the invention.
Figure 4:
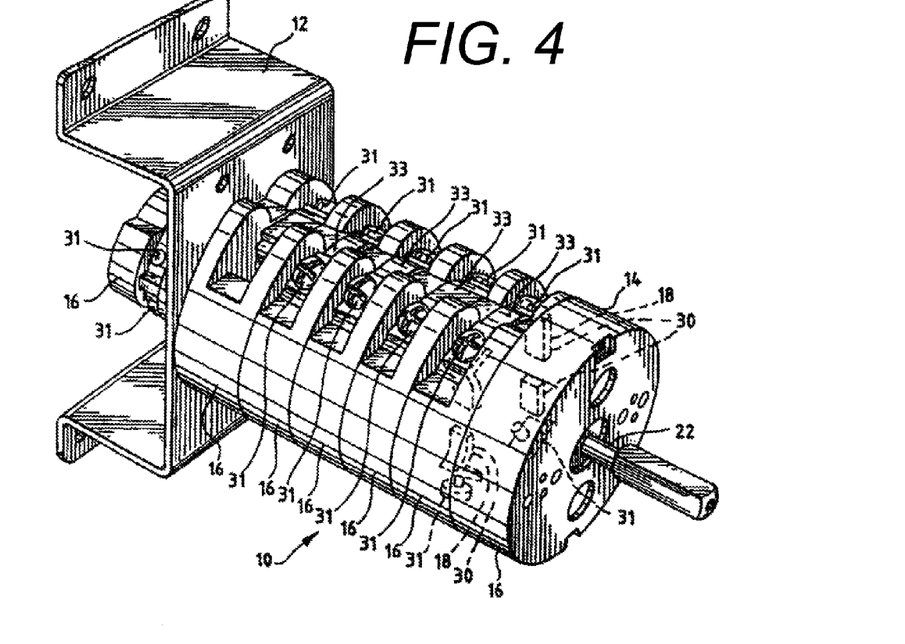
FIG. 4 is a perspective view of a switch in accordance with an embodiment of the present invention.
Figure 5:
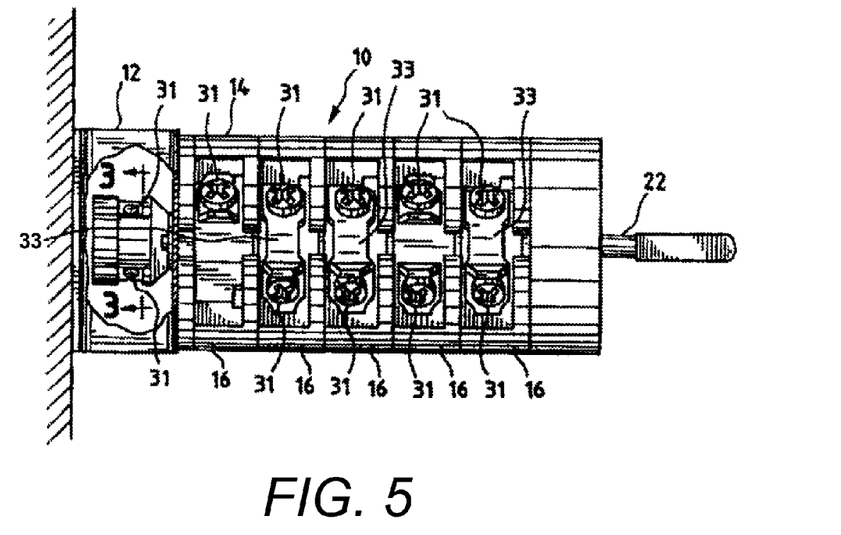
FIG. 5 is a side elevational view of a switch in accordance with an embodiment of the present invention, with the base shown in partial cutaway to show the auxiliary contacts.

The timing sequence of the main power and controller power circuit closure and opening are shown as a function of switch rotation in the plot 6 of FIG. 3. As can be seen, the early break contact removes inverter drive controller power 7 prior to removing main drive power 8 when the switch is turned towards the all-off state by an operator. Similarly, moving from right to left in the plot 6, the early break contact closes after the closing of the main power contacts when the switch is turned from the all-off state toward the all-on state by the operator, such that main power 8 is restored before inverter drive controller power 7 is restored.

There is shown in FIGS. 4 to 7 an embodiment of an inverter bypass safety switch 10 according to aspects of the present invention. The switch 10 comprises a base 12, a contact block 14 mounted on the base 12 and divided into sections 16, electrical contacts 18 located within the sections 16, cams 20 operatively connected to the electrical contacts 18, and a shaft 22 connecting all of the cams 20 together. A handle assembly attached to the shaft 22 is manipulated by an operator to turn the shaft, thereby selecting a desired operating mode. An enclosure or housing may be used to enclose the device and allow for easy mounting of the switch 10 on a wall.

The contact block 14 may include up to nine power contacts and two auxiliary contacts. The power contacts direct the incoming power either to and from the inverter drive, or directly to the motor, bypassing the inverter. The auxiliary contacts are used to control a drive control circuit in a particular manner as will be discussed later with reference to FIG. 8.

Figure 6:
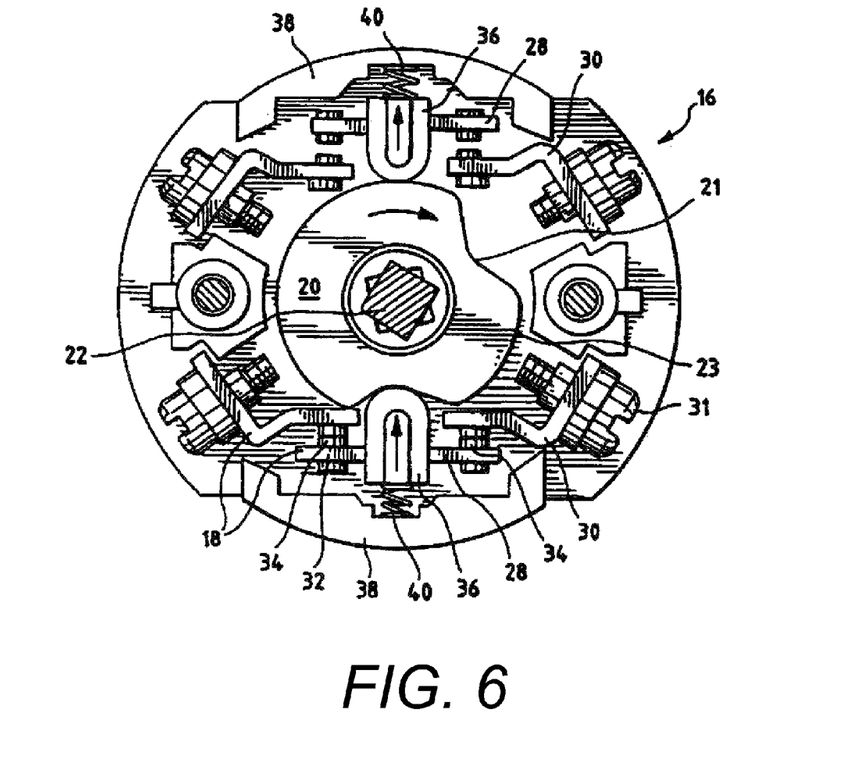
FIG. 6 is a cross sectional view of the inverter bypass safety switch, taken along line 3-3 of FIG. 5.
Figure 7:
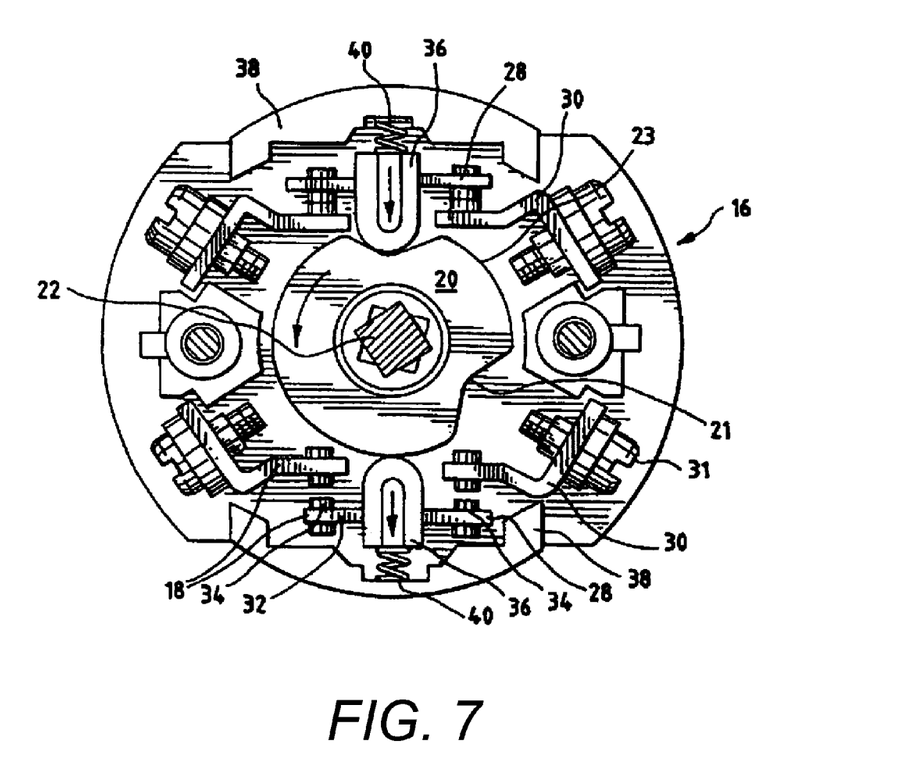
FIG. 7 is a cross sectional view of the inverter bypass safety switch, taken along line 3-3 of FIG. 5, the cam having been rotated approximately 60 degrees in a counterclockwise direction from the orientation shown in FIG. 6.

In the illustrated embodiment, the five sections 16 above the base 12 contain the nine power contacts, and the section 16 below the base 12 contains the two auxiliary contacts. As shown in FIGS. 6 and 7, a cam 20 located within each section operates the electrical contacts 18.

In an embodiment of the invention, the contacts 18 are double make/break contacts. That is, each contact 18 has a moving contact 28 and a pair of stationary contacts 30. In an optional embodiment, each moving contact 28 comprises a copper bar 32 with silver cadmium oxide contact points 34 on each end. The silver cadmium oxide contact points 34 carry the amp switching load. Each moving contact 28 is held in a follower 36 which is keyed into the housing 38 of the switch 10. The follower 36 is acted upon by the shaft-mounted cam 20.

In a further optional embodiment of the invention, two stationary contacts 30 are located on either side of each moveable contact 28 and are made of the same materials as the moveable contacts 28. The stationary contacts 30 are keyed into the housing or body 38 of the switch 10, and are connected to electrical terminals 31 for fastening external body wires to the switch 10. Some of the electrical terminals 31 are connected by electrically conductive bridges 33 to other terminals in the same section 16 of an adjacent section 16.

Each cam 20 has a profile cut into the cam 20 that determines the switching pattern. The profile includes one or more low sections 21 and one or more high sections 23. Each follower 36 is connected to a spring 40 that biases the moveable and stationary contacts 28, 30 in a closed position when the cam 20 is rotated such that a low section 21 of the cam profile faces the follower 36. The moveable and stationary contacts 28, 30 are mechanically opened when the cam 20 is rotated to a high section 23 of the cam profile. Notably, in this embodiment of the invention, opening the contacts 18 does not require use of the spring 40, and therefore is not susceptible to failure of such a spring. In the illustrated embodiment of the invention, the shaft 22 connects all of the cams 20 together, and may itself be connected to an operating handle for ease of use.

By varying the shape of the cams 20 and the orientation of the cams 20 on the shaft 22, various switching patterns can be achieved. Four different switching patterns or positions shall now be described. In a DRIVE or normal position, electrical power is routed through the switch 10 to the inverter drive 11, from the inverter drive 11 back to the switch 10, then to the motor. In the DRIVE position, full functionality of the inverter drive is available to the motor.

In a LINE or bypass position, electrical power is routed from the incoming power source through the inverter bypass safety switch 10 directly to the motor. Thus power is eliminated from both the input and output side of the inverter drive 11. In the LINE mode, the inverter drive 11 can be physically removed from service while the motor is left operating at full speed/voltage.

In an OFF position, electrical power is disconnected from both the inverter drive and the motor. In a TEST position, electrical power is routed from the incoming power source through the inverter bypass safety switch to the inverter. In this position, no power is sent to the application.

In more general terms, the inverter bypass safety switch may be configured in either a two position, three position, four position unit, depending on the needs of the user. The two position unit may have, for example, a DRIVE and a LINE position. The three position unit may have, for example, DRIVE, LINE, and OFF positions. The four position unit may have, for example, DRIVE, LINE, OFF and TEST positions. As will be appreciated, other switching patterns can be achieved by changing the configuration of the cams.

As noted above, the section 16 below the base 12 of the assembly 10 contains auxiliary contacts that are also operated via a cam linked to the shaft 22. The orientation of the cam associated with the auxiliary contacts is fixed relative to the cams associated with the main power contacts. Moreover, the auxiliary contacts may be bridged (connected) to provide power to the inverter drive controller.

In an embodiment of the invention, the auxiliary contacts are opened prior to the main power contacts when the switch is turned from the DRIVE state (inverter in use) to the LINE or bypass state (inverter not in use). In this way, the inverter drive control circuit is interrupted before the standard power contacts open. Likewise, when the operator turns the switch to the DRIVE position, the early break auxiliary contacts close after the standard power contacts so the inverter drive control circuit is powered up after the standard power contacts close.

Figure 8:
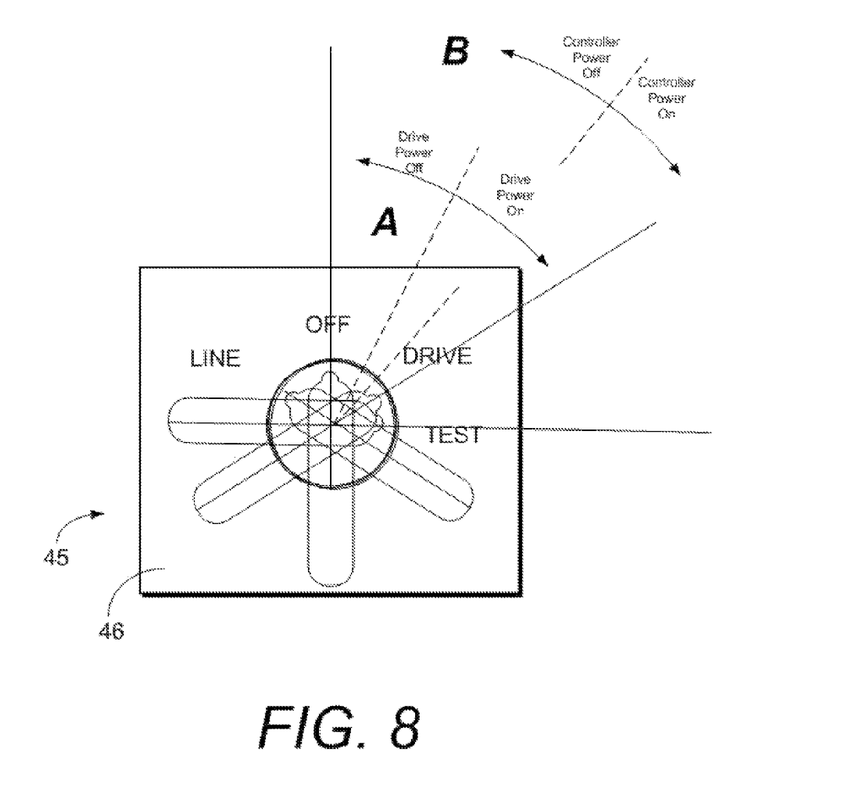
FIG. 8 is a switch schematic showing activation ranges for a primary switching section and an auxiliary contact section in an embodiment of the invention.

The operation of the auxiliary contacts (providing or discontinuing power to the inverter drive controller) in relation to the operation of the primary contacts (directing power through or around the inverter drive) is shown in the simplified schematic of FIG. 8. In particular, FIG. 8 is a simplified switch drawing showing activation ranges for a primary switching section and an auxiliary contact section in an embodiment of the invention. As can be seen, the operational modes of the switch (OFF, DRIVE, LINE, TEST) are inscribed on the face 46 of the switch 45.

In the OFF mode, the controller is not powered, as is the case with the LINE mode. However, in the DRIVE and TEST modes, the controller is powered. Thus, the controller must be powered up when switching between the OFF mode and the DRIVE mode. In keeping with the principles described above however, the main power must be turned on before, and turned off after the controller power is turned off and on respectively. Thus, the cams of the primary and auxiliary sections are set up such that at a rotation angle A (from the OFF position), the primary power is applied to the inverter and at a greater angle B, the driver controller power is engaged. At rotation angles between A and B, the inverter power is on and the controller power is off. At angles greater than B, both are on, and at angles less than A, both are off.

Inverter drive control circuits typically operate at very low power levels, which standard power contacts cannot reliably conduct or switch. Thus, the auxiliary contacts may be gold flash plated to allow trouble free operation of the contacts while using the low power available from the control circuit of the inverter drive. Gold plating would still allow the auxiliary contacts to be used in applications that use higher power control circuits. Such higher power control circuit applications may "burn off" the gold flash plating of the contacts, but the underlying conventional power contact material will enable the contacts to continue functioning.

The auxiliary power contacts section of the switch may be manufactured as an integral part of the disconnect switch or may be manufactured as a module attachable to the disconnect switch. In this embodiment of the invention, the attaching and removing of modules may be executed at the factory or on site. In a further embodiment of the invention, no special tools are required to either add or remove the modules or to install or remove the disconnect switch from the power circuit.

In operation, the desired switching pattern is achieved by turning the shaft, e.g., via an operating handle, to the desired setting. Turning the handle causes the cams 20 to rotate, which acts upon the moveable contacts 28, either opening or closing the electrical connections between the moveable and stationary contacts.

While not important to the present invention, it will be noted that the handle assembly, if used, may have any number of configurations. A "Selector Style" handle assembly may include a backplate, an operating handle mounted to the backplate, and a gasket mounted to the side of the backplate opposite the handle. A "Lockout Style" handle assembly may include all of the features of the Selector Style embodiment, and further include holes for mounting one or more padlocks to lock the handle in the LINE, OFF, DRIVE, or TEST positions. In this way, the switch 10 can be locked into a desired position.

A "Panel Mount" style may include all of the features of the Lockout Style embodiment, and further include an extension shaft and an extension shaft coupling. The extension shaft and extension shaft coupling allow the switch 10 to be mounted on the rear panel of the enclosure while the handle assembly is mounted on the front of the enclosure 26.

It will be appreciated that the present invention provides positive removal of the electrical power from the inverter drive and features entirely mechanical operation. That is, the switch 10 does not depend on coils, relays, contactors, or other electromechanical devices to switch power. Moreover, the present invention features positive break contacts. This means that, should a contact 18 "weld", the operating handle cannot be turned, thus assuring the operator that when the operating handle has been turned the contacts 18 have been transferred. If the operating handle is able to be turned, the contacts 18 transfer.

It is anticipated that the switch 10 may be enclosed in a UL listed nonmetallic enclosure or other enclosure as desired, allowing for easy installation of the switch on a wall. It is also anticipated that the switch 10 may be connected to a fuse-block to protect the motor against short circuits. It is further anticipated that the switch 10 can be enclosed in a nonmetallic enclosure or other enclosure with a disconnect switch, thus combining the features of an inverter bypass switch with a disconnect switch. Finally, it is anticipated that the switch 10 can be used in conjunction with a manual motor starter. The manual motor starter would provide protection against excessive motor current and short circuits. The manual motor starter could be reset like a circuit breaker.

It will be appreciated that the foregoing description provides useful examples of the disclosed system and device. In particular, there has been described a cam-operated disconnect switch that provides a simple and economical means for preventing the possibility of stray/surge current from damaging the solid state components of an inverter drive. The disconnect switch includes "early break" auxiliary contacts that open before the standard power contacts when the switch is deactivated (turned off) by an operator. Likewise, when an operator turns on the disconnect switch the early break auxiliary contacts close after the standard power contacts. However, it is contemplated that other implementations of the disclosure may differ in detail from the foregoing examples.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

I claim:

1. An inverter bypass switch for selectively routing electrical power through or around an inverter drive, said switch comprising one or more sections joined together to form a contact block having a central axis, a rotatable shaft disposed along the central axis, electrically conductive exterior interconnections for connecting selected stationary contacts, externally mounted electrical contacts for receiving electrical wires, each section comprising:
    a cam mounted on the shaft;
    at least one stationary contact connected to the contact block; and
    at least one radially sliding moveable contact operably connected to the cam by a spring-loaded follower that biases the moveable contact into engagement with the stationary contact when a low profile section of the cam faces the follower;
    wherein manual rotation of the shaft causes the cam to rotate and act upon the moveable contact to cause the moveable contact to move either into or out of engagement with the stationary contact, thus causing electrical power to be directed either through or around the inverter drive;
    the inverter bypass switch further comprising an auxiliary contact section having an auxiliary contact actuated by turning of the shaft, such that the auxiliary contact opens before electrical power is directed around the inverter drive and closes after the electrical power is directed through the inverter drive, wherein opening of the auxiliary contact removes input power from a controller of the inverter drive.

2. The inverter bypass switch of claim 1 wherein the shape of the cams, the placement of the cams within the sections and in relation to the other cams, the placement of exterior interconnections of the stationary contacts and the attachment of exterior wires are all selected to provide four discreet switch positions including:
    a DRIVE position, wherein electrical power is routed through the inverter bypass switch to the inverter drive, from the inverter drive back to the inverter bypass switch and then to an application;
    a LINE position, wherein electrical power is routed from an incoming power source through the inverter bypass switch and directly to the application;
    an OFF position, wherein electrical power is disconnected from both the inverter bypass switch and the application; and
    a TEST position, wherein electrical power is routed through the inverter bypass switch to the inverter drive, but no power is sent from the inverter drive to the application.

3. The inverter bypass switch of claim 1 further including an enclosure configured for mounting after the inverter drive.

4. The inverter bypass switch of claim 1 in which a portion of the switch is configured for mounting after the inverter drive.

5. The inverter bypass switch of claim 1 in which a portion of the switch is configured for mounting before the inverter drive.

6. The inverter bypass switch of claim 1 in which a portion of the switch is configured for mounting before the inverter drive.

7. The inverter bypass switch of claim 1 in which the inverter drive comprises an enclosure and the inverter bypass switch is an open component for use in the same enclosure.

8. The inverter bypass switch of claim 1 further comprising an enclosure configured for mounting outside of an enclosure of the inverter drive.

9. The inverter bypass switch of claim 1 in which the switch is manually operated.

10. The inverter bypass switch of claim 1 in which the switch is power operated.

11. The inverter bypass switch of claim 1 in which the auxiliary contact is an integral part of the inverter bypass switch.

12. The inverter bypass switch of claim 1 in which the auxiliary contact is a module that is removably attached to the inverter bypass switch.

13. The inverter bypass switch of claim 1 in which the auxiliary contact is gold plated.

* * * * *